United States Patent
Islam et al.

(10) Patent No.: US 9,602,315 B2
(45) Date of Patent: Mar. 21, 2017

(54) METHOD AND APPARATUS FOR PASSIVE CONTINUOUS-TIME LINEAR EQUALIZATION WITH CONTINUOUS-TIME BASELINE WANDER CORRECTION

(71) Applicant: Intel Corporation, Santa Clara, CA (US)

(72) Inventors: Syed S. Islam, Cupertino, CA (US); Yick Yaw Ho, Folsom, CA (US); Ronald W. Swartz, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/569,574

(22) Filed: Dec. 12, 2014

(65) Prior Publication Data

US 2016/0173299 A1  Jun. 16, 2016

(51) Int. Cl.
 *H04L 25/03* (2006.01)
 *H04L 25/06* (2006.01)

(52) U.S. Cl.
 CPC .. *H04L 25/03057* (2013.01); *H04L 25/03254* (2013.01); *H04L 25/06* (2013.01)

(58) Field of Classification Search
 CPC .............. H04L 25/03254; H04L 25/06; H04L 25/0276; H04L 25/03878; H04L 25/0292; H04L 25/03019; G11B 20/10203; G11B 20/10027; G11B 20/10046; G11B 20/18; H03K 5/007
 See application file for complete search history.

(56) References Cited

U.S. PATENT DOCUMENTS

| | | | | |
|---|---|---|---|---|
| 5,289,823 | A | * | 3/1994 | Eckerle .................. A61B 5/026 600/485 |
| 5,815,051 | A | * | 9/1998 | Hamasaki ................ H03H 7/06 257/533 |
| 6,038,266 | A | * | 3/2000 | Lee et al. ...................... 375/317 |
| 6,140,857 | A | * | 10/2000 | Bazes ........................... 327/307 |
| 6,167,080 | A | * | 12/2000 | Hee .................... H04L 25/03885 375/232 |
| 6,215,816 | B1 | | 4/2001 | Gillespie et al. |
| 6,424,209 | B1 | * | 7/2002 | Gorecki ............. H03H 11/1291 327/337 |
| 6,567,472 | B1 | * | 5/2003 | Poulis ................. H04L 25/0278 330/260 |
| 6,882,224 | B1 | * | 4/2005 | Gaboury et al. .............. 330/253 |

(Continued)

FOREIGN PATENT DOCUMENTS

KR  1020140038875  3/2014

OTHER PUBLICATIONS

Francese et al., "A 16Gb/s Receiver with DC wander compensated Rail-to-Rail AC Coupling and Passive Linear-Equalizer in 22nm CMOS", European Solid State Circuits Conference (ESSCIRC), Sep. 2014.*

(Continued)

*Primary Examiner* — Vineeta Panwalkar
(74) *Attorney, Agent, or Firm* — Green, Howard & Mughal, LLP

(57) ABSTRACT

Described is an apparatus which comprises: an amplifier; and a passive continuous-time linear equalizer integrated with a baseline wander (BLW) corrector, wherein the integrated equalizer and BLW corrector is coupled to the amplifier.

23 Claims, 8 Drawing Sheets

(56) References Cited

U.S. PATENT DOCUMENTS

| | | | |
|---|---|---|---|
| 6,950,514 B2* | 9/2005 | Enriquez et al. | 379/413 |
| 7,047,428 B2* | 5/2006 | Bui | 713/320 |
| 8,139,628 B1 | 3/2012 | Altekar | |
| 8,274,326 B2* | 9/2012 | Boecker | H03F 1/301 |
| | | | 327/559 |
| 2002/0075584 A1* | 6/2002 | Patti | G11B 5/012 |
| | | | 360/25 |
| 2004/0022303 A1* | 2/2004 | Tonietto | G11B 20/10009 |
| | | | 375/219 |
| 2006/0120491 A1* | 6/2006 | Yen | H03G 3/3089 |
| | | | 375/345 |
| 2007/0047636 A1* | 3/2007 | Lim | H04B 3/10 |
| | | | 375/229 |
| 2007/0286315 A1* | 12/2007 | Hong | H04L 25/03057 |
| | | | 375/345 |
| 2008/0069191 A1* | 3/2008 | Dong | H04L 25/03178 |
| | | | 375/219 |
| 2008/0084236 A1* | 4/2008 | Chung | H04B 1/30 |
| | | | 327/307 |
| 2008/0238587 A1 | 10/2008 | Shin et al. | |
| 2010/0046600 A1* | 2/2010 | Zerbe et al. | 375/233 |
| 2012/0133414 A1* | 5/2012 | Zhuang | 327/333 |

OTHER PUBLICATIONS

International Search Report and Written Opinion mailed Feb. 19, 2016 for PCT Application No. PCT/US15/59519.

\* cited by examiner

300 Single-ended small-signal model

320 Low-frequency path $R_{5e} = R_5 + R_1(R_3//R_4)/\{R_1+(R_3//R_4)\}$ $V_i \times (R_3//R_4)/\{R_1+(R_3//R_4)\}$ 330 High-frequency path $R_{5e} = R_5 + R_1(R_3//R_4)/\{R_1+(R_3//R_4)\}$ $R_2 << R_{5e}$

METHOD AND APPARATUS FOR PASSIVE CONTINUOUS-TIME LINEAR EQUALIZATION WITH CONTINUOUS-TIME BASELINE WANDER CORRECTION

BACKGROUND

A receiver (Rx) frontend can either be DC-coupled (i.e., Direct Current (DC) coupled) or AC-coupled (i.e., Alternating Current (AC) coupled) to an input-output (I/O) pad. DC-coupled receivers are generally high power consuming circuits which are not attractive for low power devices, while AC-coupled receivers suffer from baseline wander (BLW) where the short term average value of the input (e.g., differential input to a receiver amplifier) may drift apart due to a non-balanced number of logical 1's and 0's in the input data pattern. BLW may significantly degrade voltage and timing margins at the receiver to the point of failure.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1B:
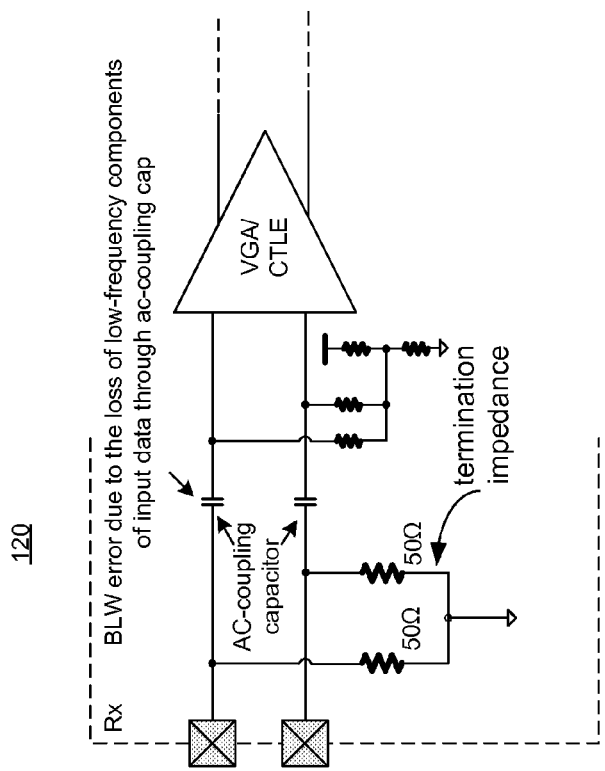
FIG. 1B illustrates a traditional AC-coupled receiver front-end.
Figure 1A:
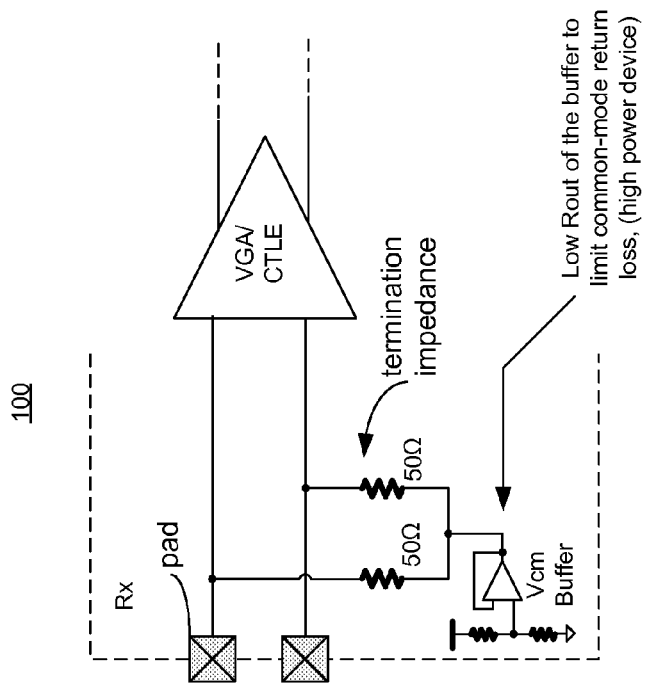
FIG. 1A illustrates a traditional DC-coupled receiver front-end.

The DC-coupled topology 100, as shown in FIG. 1A, has a receiver amplifier directly connected to input pads. Here, the receiver amplifier consists of a Voltage Gain Amplifier (VGA) and a Continuous-Time Linear Equalizer (CTLE). DC-coupled topology 100 requires the output impedance of the input common-mode generation circuit (Vcm Buffer) to be low to limit the common-mode return loss. Hence, DC-coupled topology 100 requires power hungry common-mode generation circuitries (e.g., the Vcm Buffer that may include a unity gain amplifier and a voltage reference generator, in this case a resistor based voltage divider). Besides, DC-coupled topology 100 provides termination to a common-mode voltage (non-Vss or non-ground, for example, output of the Vcm Buffer), which requires complicated circuits to prevent electrical overstress (EOS) in the event of an in-rush common-mode current from the transmitter to the receiver.

The AC-coupled topology 120, as shown in FIG. 1B, includes DC blocking capacitors (referred to here as the AC-coupling capacitors) and passive resistors to provide common-mode voltage at the inputs of the VGA/CTLE. The AC-coupled topology 120 alleviates the above-mentioned issues of DC-coupled scheme 100 as well as allowing a DC voltage level shifting from the pads to the proper receiver amplifier input bias voltage. However, the AC-coupling capacitors cause baseline wander (BLW). The term "BLW" or "baseline wander" generally refers to an error case when the short term average value of the inputs (i.e., inputs to VGA/CTLE) may drift apart due to a non-balanced number of logical 1's and 0's in the data pattern. The inputs to VGA/CTLE may be single-ended or differential. BLW may significantly degrade voltage and timing margins at the receiver (i.e., VGA/CTLE) to the point of failure.

To minimize the BLW error, the time constant of the pole introduced by the AC-coupling capacitor of FIG. 1B can be made very large (e.g., hundreds of nano-seconds). However, a large AC-coupling capacitor results in huge resistor or capacitor area on the die. BLW error can be compensated using a digital control loop. However, it is challenging to match the digital loop gain bandwidth and the settling time to the BLW rate of change, which makes the digital control loop design demanding.

A typical receiver frontend provides AC-to-DC peaking using a linear equalizer to compensate the high-frequency signal loss through a channel. The term "AC-to-DC peaking" generally refers to the ratio of high-frequency (approx. DataRate/2) to the low-frequency (approx. 50 MHz) gains.

This high-frequency signal loss through the channel can be compensated using an active topology such as a capacitive source-degenerative amplifier or a Cherry-Hooper bandwidth enhancement amplifier with a low-pass filter in the feedback path. In a source-degeneration scheme, the dominant pole is a function of the amplifier trans-conductance ($g_m$) and hence the AC-to-DC peaking is a function of process, voltage, and temperature (PVT) variations. In a Cherry-Hooper topology, the AC-to-DC peaking is limited by the non-linearity of the amplifier schemes. In addition, the peaking frequency moves to a lower value as the AC-to-DC peaking setting is increased. All these pose challenges to design a single receiver that can support a wide range of data rates.

Some embodiments describe a receiver analog frontend architecture that continuously corrects the BLW (or DC wander) while providing linear equalization through resistive and capacitive devices. In some embodiments, the architecture employs a hybrid approach using on-die AC-coupling for the high frequency components of input data and DC-coupling for the low frequency components of input data. Here, the term high frequency generally refers to a frequency higher than, for example, 20 MHz. Here, the term "low frequency" generally refers to a frequency lower than, for example, 20 MHz (i.e., closer to DC level frequencies). In some embodiments, the receiver architecture provides BLW correction and linear equalization simultaneously that is insensitive to PVT (silicon Process, Voltage, and Temperature) variations.

Some embodiments combine the continuous-time BLW correction mechanism with linear equalization circuits to realize reuse of each circuit component efficiently. In some embodiments, the continuous-time BLW correction overcomes the digital BLW correction challenges to balance the loop bandwidth and settling time. In some embodiments, the BLW correction mechanism also alleviates the need of a large AC-coupling capacitor and therefore can be set to meet the linear equalizer and AC-gain requirements. In some embodiments, the linear equalization mechanism controls the AC-to-DC peaking by tuning process insensitive capacitor ratio and changes the peaking frequency by changing an adjustable resistor. A stable peaking frequency that is decoupled from the AC-to-DC peaking allows scalability for multiple data rates.

There are many technical effects of various embodiments. For example, continuous-time BLW correction for non-DC-balanced coding is achieved using a low power and small area architecture. The continuous-time BLW correction for the non-DC-balanced coding scheme of various embodiments overcomes the digital BLW correction challenges of balancing loop bandwidth and settling time. Some embodiments allow the use of a significantly low capacitance value for the on-die AC-coupling capacitive device and thus reduce the pad capacitor contribution. In some embodiments, this AC-coupling capacitive device(s) is reused for AC-to-DC peaking generation (i.e., linear equalizer).

In some embodiments, linear equalization with AC-to-DC peaking is realized by an adjustable capacitance ratio (i.e., not the magnitude of capacitances) and hence the scheme is less process sensitive than traditional schemes. In some embodiments, the peaking frequency is tunable through an adjustable resistance for supporting multiple data rates. In some embodiments, a stable peaking frequency is decoupled from the AC-to-DC peaking which allows scalability for multiple data rates.

In some embodiments, input termination to ground is maintained and so the power of the input common-mode generation scheme is lower compared to the conventional DC-coupling approaches (e.g., approximately 500 µA for some embodiments as opposed to 2 mA to 3 mA for conventional DC-coupling approaches). The various embodiments can be used for any nominally AC-coupled receiver front-end (i.e., signal-ended or differential) which supports data patterns with an unequal or equal number of 1's and 0's. For example, the receiver of various embodiments can be used for Peripheral Component Interconnect (PCI) Generation 3 compliant receiver. The receiver of various embodiments can also be used as PCI Express (PCIe) compliant receiver (e.g., PCIe1/2/3), Serial ATA (ATA) compliant receiver (e.g., SATA 1/2/3), Universal Serial Bus (USB) compliant receiver (e.g., USB1/2/3), etc.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, optical, or wireless connection between the things that are connected, without any intermediary devices. The term "coupled" means either a direct electrical, optical, or wireless connection between the things that are connected or an indirect connection through one or more passive or active intermediary devices. The term "circuit" means one or more passive and/or active components that are arranged to cooperate with one another to provide a desired function. The term "signal" generally refers to at least one current signal, voltage signal, optical signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2:
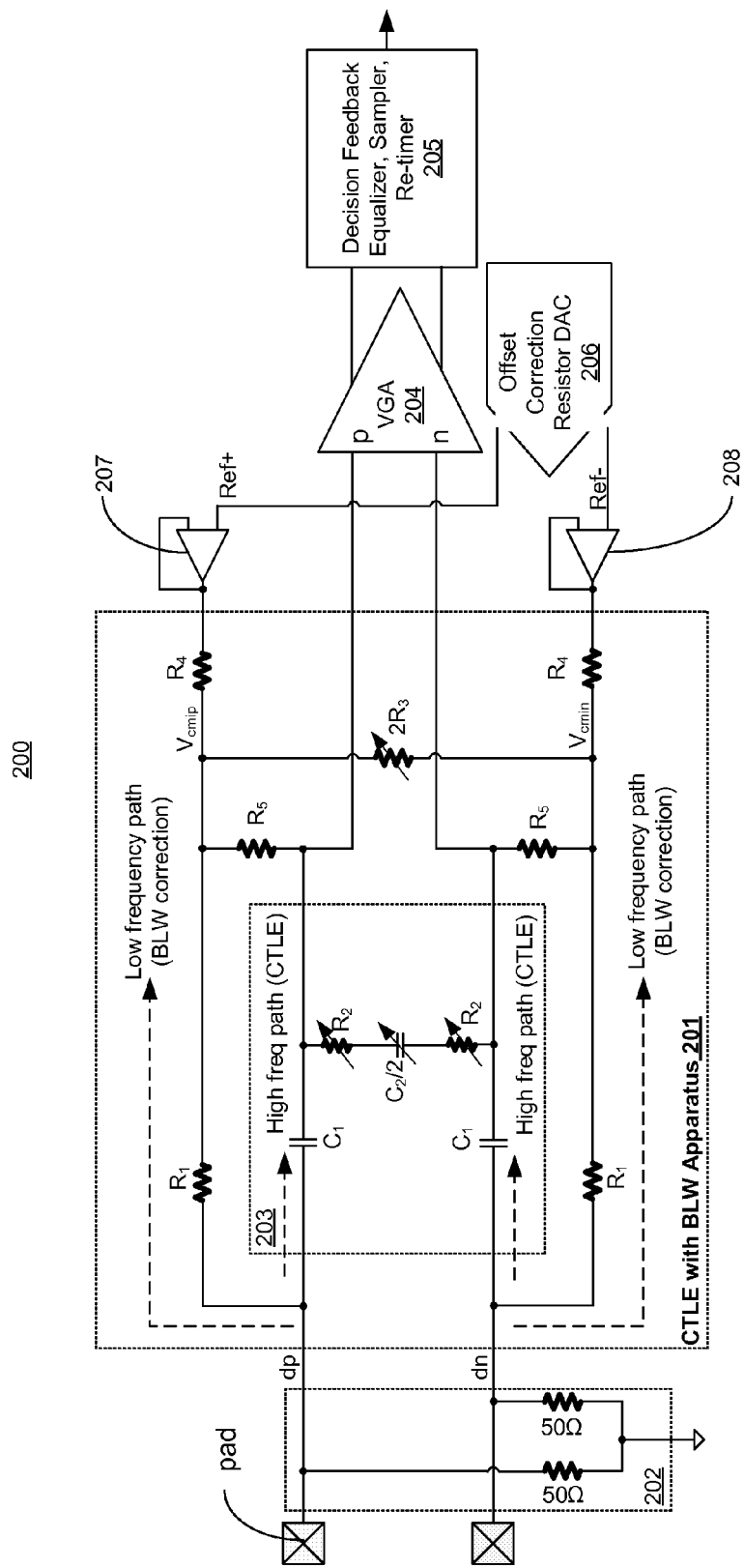
FIG. 2 illustrates an apparatus for passive continuous-time linear equalization (CTLE) with continuous-time baseline wander (BLW) correction, according to some embodiments of the disclosure.

FIG. 2 illustrates apparatus 200 for linear equalization with continuous-time BLW correction, according to some embodiments of the disclosure. In some embodiments, apparatus 200 comprises CTLE with BLW correction Apparatus 201, input termination impedance (e.g., 50Ω ground terminated resistive devices) 202, VGA 204, Decision Feedback Equalizer (DFE) 205, Offset Correction Resistor Digital to Analog Converter (DAC) 206, unity gain buffers 207 and 208. In some embodiments, other types of post processing logic may be used downstream of VGA 204 instead of or in combination of DFE 205. For example, Sampler, Re-timer, etc. may be used for post processing output of VGA 204.

The embodiments of FIG. 2 are described with reference to a differential receiver. However, the embodiments are also applicable to a single-ended receiver as described with reference to FIG. 5. Referring back to FIG. 2, in some embodiments, differential input dp/dn is received at the pads. Here, labels for signal names and nodes are interchangeably used. For example, "dp" and "dn" may refer to differential input signals or nodes depending on the context of the sentence.

In some embodiments, CTLE with BLW Apparatus 201 includes low frequency paths for BLW correction and DC coupling, and high frequency paths 203 for continuous-time linear equalization. In some embodiments, the low frequency paths comprise paths for differential signals dp and dn, respectively. In some embodiments, the low frequency paths comprise resistive devices with resistances $R_1$, $R_3$, $R_4$, and $R_5$ coupled together as shown to provide low frequency path from input nodes dp/dn to inputs p/n of VGA 204, respectively. In some embodiments, resistance $R_3$ is adjustable as indicated by the arrow. For example, resistance $R_3$ is adjustable by hardware (e.g., fuses, registers, etc.) or firmware (e.g., software, operating system, etc.), or both. Here, "$2R_3$" refers to resistances of two series coupled resistive devices each having resistance of $R_3$.

In some embodiments, the high frequency path (i.e., CTLE) 203 is provided via AC-coupling capacitive devices $C_1$ which couples the AC (or high frequency) components of the input differential signals dp and do to input ports p/n of VGA 204. In some embodiments, high frequency path 203 comprises a high-pass filter formed with capacitive devices with capacitances $C_1$ and $C_2$, and resistive devices of resistance $R_2$. In some embodiments, resistance $R_2$ is adjustable as indicated by the arrow. For example, resistance $R_2$ is adjustable by hardware (e.g., fuses, registers, etc.) or firmware (e.g., software, operating system, etc.), or both. Here, "$C_2/2$" is equivalent to two series coupled capacitive devices with capacitances $C_2$. The embodiments are not limited to the specific architecture of CTLE with BLW Apparatus 201. In other embodiments, other architectures for 201 may be used such that both AC and DC coupling on input signal(s) is provided to receiver amplifier and/or equalizer.

In some embodiments, resistive devices with resistances $R_1$-$R_4$ are coupled to the supply voltage and provide positive and negative common-mode voltages Vcmip and Vcmin for the input ports p/n of VGA 204, respectively. In some embodiments, common-mode and DC differential voltages Vcmip and Vcmin are provided by unity gain amplifiers 207 and 208 via resistive devices having resistance $R_4$ as shown. For example, reference voltages Ref+ and Ref− from Offset Correction Resistor DAC 206 are input to unity gain amplifiers/buffers 207 and 208, respectively, to generate the voltages Vcmip and Vcmin. While various embodiments illustrate a Resistor DAC 206, other types of DACs or reference generators may be used. In some embodiments, the DC differential voltage can be used for offset correction.

In some embodiments, input common mode voltage at the receiver amplifier 204 is established through $R_4$−($R_1$+50Ω) resistor divider. In some embodiments, the capacitive and resistive devices $C_1$, $C_2$, $R_1$, $R_2$, $R_3$, $R_4$, and $R_5$ together constitute a CTLE. In some embodiments, receiver input termination to ground is achieved while using a low-power receiver amplifier input common-mode generation scheme. In some embodiments, the low bandwidth of the resistive device path (having resistance $R_1$) allows for higher resistance values for $R_1$ and $R_4$ (e.g., in kΩ range), which limits the current flowing to the pads from the input bias voltage followers 207 and 208.

In some embodiments, the input termination is determined by the 50Ω termination to ground (as shown by termination impedance block 202) and is unaffected by other components. In some embodiments, the current of the common-mode generation scheme is quite low (e.g., $Vref^+/\{R_4+R_1+50\}$ and $Vref^-/\{R_4+R_1+50\}$). In such embodiments, the bandwidth and hence the power of the common-mode generation buffers is also low (e.g., a few MHz). In some embodiments, a single common mode voltage generation buffer is used for both the positive 'p' and negative 'n' inputs of VGA 204. In some embodiments, two common mode voltage generation buffers 207 and 208 are used to enable offset correction at the inputs of the receiver VGA 204. Power is saved with various embodiments. For example, the overall current consumption for apparatus 201 is near 500 uA as opposed to 2 mA to 3 mA for an on-die DC-coupled interface of FIG. 1A.

Referring back to FIG. 2, in some embodiments, the low frequency components of the input data dp and dn are fed through the resistive device path having resistance $R_1$ to the inputs of VGA 204. This ensures a continuous-time BLW correction as opposed to complicated digital loops employed in some existing designs.

In some embodiments, the high frequency components of the input data dp and dn are AC-coupled through capacitive device having capacitance $C_1$. As the burden of BLW correction is relieved, the capacitance of $C_1$ can be kept smaller (e.g., approximately 1 pF). In some embodiments, capacitive device having capacitance $C_1$ is reused as part of the CTLE operation. In some embodiments, the AC-to-DC peaking of the CTLE is determined by the capacitance ratio $C_1/(C_1+C_2)$ rather than the absolute magnitudes of the capacitances.

In some embodiments, the tunability of the AC-to-DC peaking is achieved by varying capacitance $C_2$. This makes the AC-to-DC peaking insensitive to process variations compared to other CTLE schemes such as the one using source degeneration where peaking is determined by the trans-conductance of the input differential pair. In some embodiments, tunability of the peaking frequency to support multiple data rates is achieved by varying resistance $R_2$. In some embodiments, the reference voltage inputs Ref+ and Ref− to the common-mode (Vcm) buffers 207 and 208 is generated from a resistor ladder. In some embodiments, by converting the resistor ladder into a resistor DAC, an offset correction scheme (as indicated by DAC 206) can be implemented without burning additional power in the Vcm generation scheme.

While the embodiments are described with reference to passive resistive and capacitive components, these components can be implemented using passive only devices, a mix of passive and active devices, or active only devices. For example, transistors can be operated in their linear operating region to behave as active resistive devices. Transistors can also be used as capacitive devices. For example, gate terminal of the transistor is used to provide the capacitance while the source/drain terminals are coupled together (e.g., to a high power supply or to ground). In some embodiments, capacitive devices are implemented as metal capacitors. In some embodiments, capacitive devices are implemented as metal-insulator-metal (MIM) capacitors or metal-finger capacitors (MFC).

FIGS. 3A-F illustrate a transformation of an RC network over frequency using apparatus 200 for linear equalization with continuous-time BLW correction, according to some embodiments. It is pointed out that those elements of FIGS. 3A-F having the same reference numbers (or names) as the elements of any other figure can operate or function in any manner similar to that described, but are not limited to such.

Figure 3A:
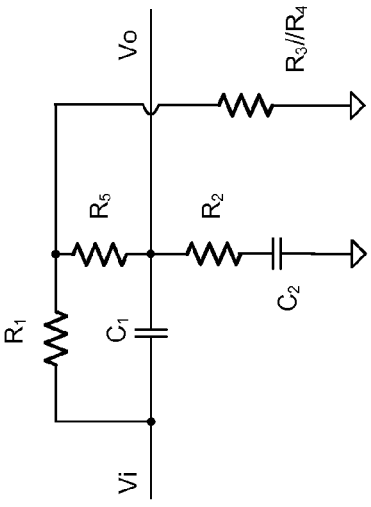
FIG. 3A-F illustrate a transformation of an RC (Resistor-Capacitor) network over frequency using apparatus for linear equalization with continuous-time BLW correction, according to some embodiments.

FIG. 3A illustrates a single-ended small-signal model 300 of the RC network illustrated in CTLE with BLW Apparatus 201. So as not to obscure the embodiments, a half circuit model is shown where "Vi" corresponds to "dp" or "dn" and "Vo" corresponds to VGA 204 port 'p' or 'n'.

Figure 3B:
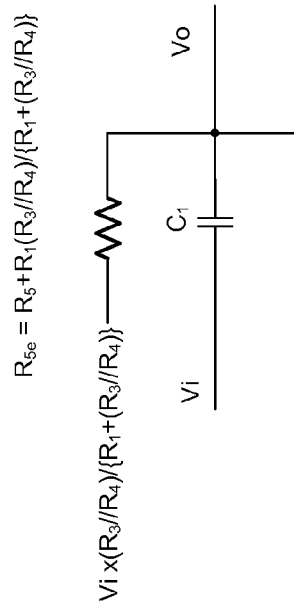

FIG. 3B illustrates an approximate small-signal model of low frequency path 320 of the RC network illustrated in CTLE with BLW Apparatus 201, according to some embodiments. The low frequency components of the input data pass through resistive device of resistance $R_1$. The impedance looking in from node Vi is high impedance and is $R_{5e}=R_5+R_1(R_3\|R_4)/\{R_1+(R_3\|R_4)\}$. The low frequency transfer function is given by, $$A_{LP}(s) = \frac{(R_3\|R_4)}{R_1+(R_3\|R_4)} \times \frac{\left(1+sC_1R_{5e}\times\left\{\frac{R_1+(R_3\|R_4)}{(R_3\|R_4)}\right\}\right)}{(1+s(C_1+C_2)R_{5e})} \quad (1)$$

Figure 3C:
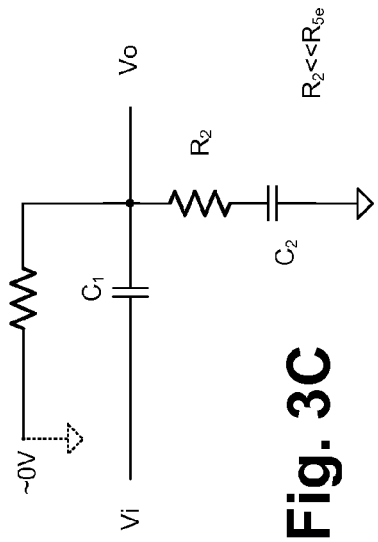

FIG. 3C illustrates an approximate small-signal model for high frequency path 330 (i.e., 203) of the RC network illustrated in CTLE with BLW Apparatus 201, according to some embodiments. The high-frequency transfer function is given by:

$$A_{HP}(s) = \frac{sC_1R_{5e}(1+sC_2R_2)}{1+sC_1R_{5e}+sC_2(R_2+R_{5e})+s^2C_1C_2R_2R_{5e}} \quad (2)$$

Figures 3D, 3E:
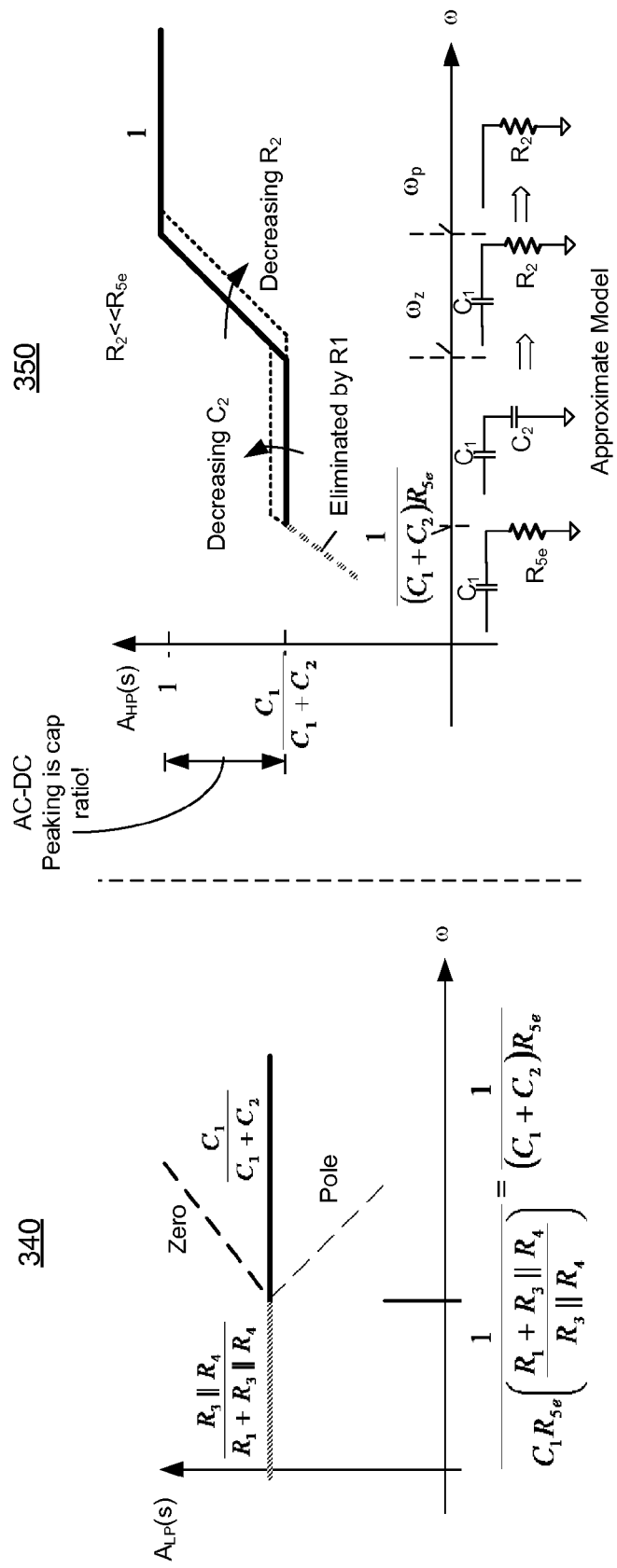

FIG. 3D illustrates bode plot 340 for the low frequency operation, according to some embodiments. The DC gain from the pad to the input of receiver amplifier VGA 204 is determined by the resistor ratio $(R_3\|R_4)/\{R_1+(R_3\|R_4)\}$.

FIG. 3E illustrates bode plot 350 for the high frequency operation, according to some embodiments. At higher frequencies, the signal propagates through capacitive device having capacitance $C_1$, and the AC gain is determined by the capacitive ratio $C_1/(C_1+C_2)$.

In some embodiments, the BLW correction is achieved by aligning $C_1/(C_1+C_2)$ with the DC gain (or through low frequency pole-zero cancellation given in equation 1) based on the following equation:

$$\frac{C_1}{C_1+C_2} = \frac{(R_3\|R_4)}{R_1+(R_3\|R_4)} \quad (3)$$

In some embodiments, the AC-to-DC peaking is determined by the capacitance ratio $C_1/(C_1+C_2)$ rather than absolute magnitudes of capacitances. This makes the AC-to-DC peaking parameter insensitive to capacitance variation over PVT. In some embodiments, the tuning of the AC-to-DC peaking for different channel loss is achieved by adjusting capacitance $C_2$. For example, the AC-to-DC peaking can be reduced by decreasing capacitance $C_2$. In some embodiments, the peaking frequency of the equalizer can be adjusted for different data rates by varying the high frequency pole/zero values by adjusting resistance $R_2$. For example, when the resistance $R_2$ decreases, the peaking frequency of the equalizer increases.

In some embodiments, the BLW correction is achieved by varying resistance $R_3$ as capacitance $C_2$ is changed for different AC-to-DC peaking settings. In such embodiments, the BLW correction, linear equalization peaking frequency, and AC-to-DC peaking are each adjusted with different independent circuit components, therefore making the design much simpler in setting the performance range values. For comparison, peaking frequency in a conventional Cherry-Hooper type CTLE moves toward a lower value as the AC-to-DC peaking increases and hence it limits the amount of equalization. The various embodiments described here eliminate such problem.

Figure 3F:
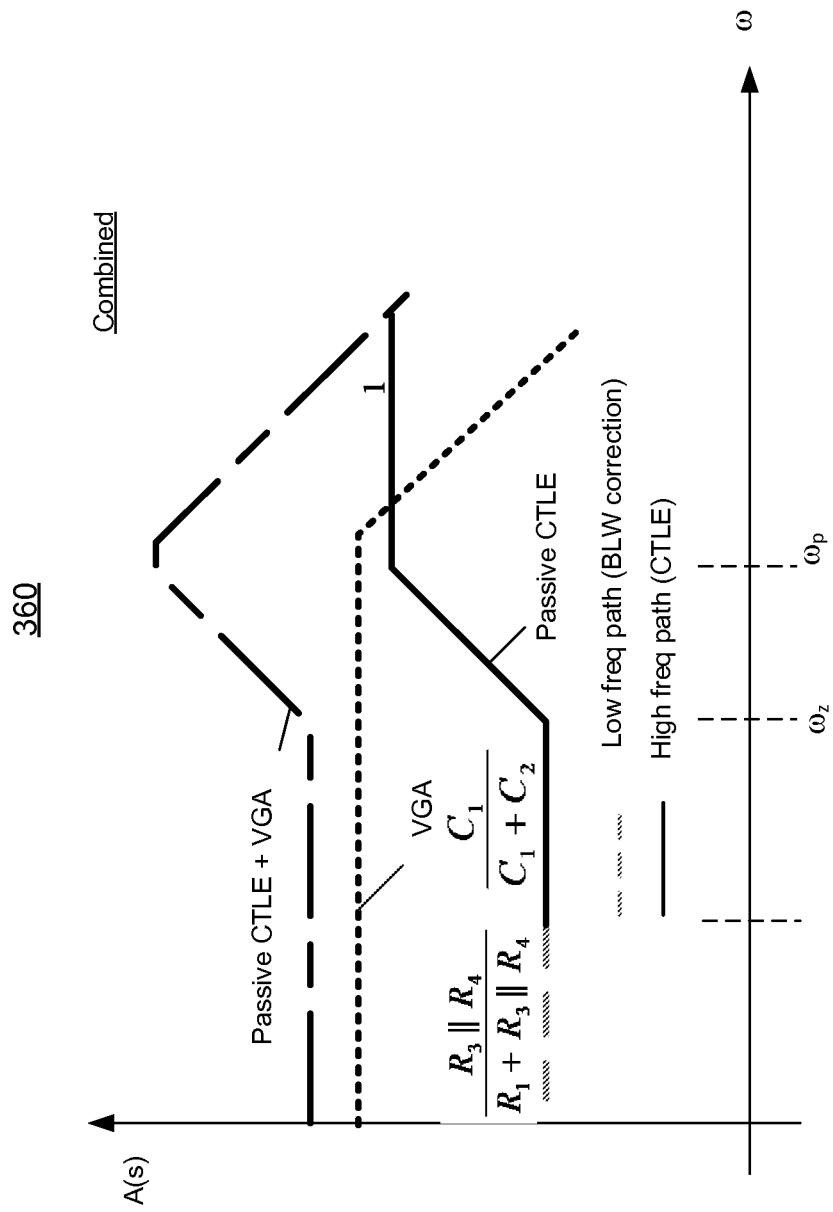

FIG. 3F illustrates bode plot 360 for the low and high frequency operation, according to some embodiments. Here, x-axis is frequency and y-axis is gain magnitude. Plot 360 shows three waveforms. Waveform 363 is the bode plot of passive CTLE 201. Waveform 362 is the bode plot of VGA 204. Waveform 361 is the combined bode plot of Passive CTLE 201 and VGA 204.

Figure 4A:
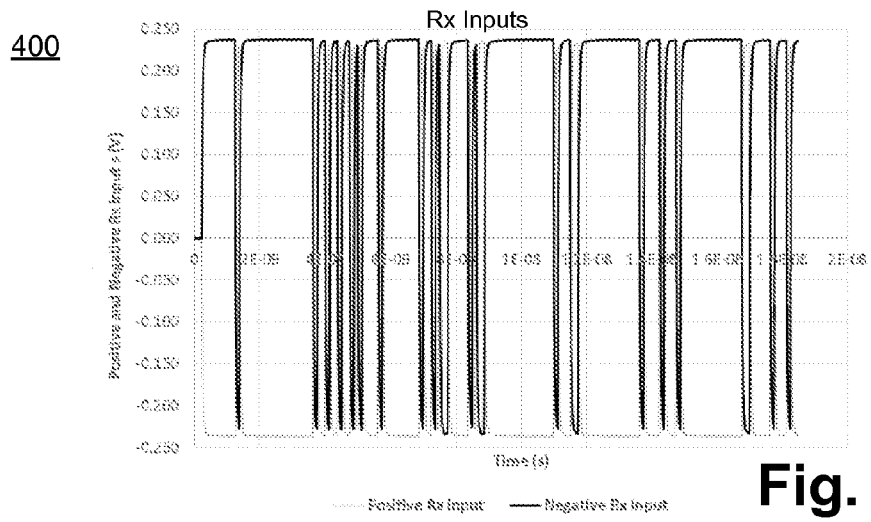
FIG. 4A illustrates a plot showing receiver inputs.
Figure 4B:
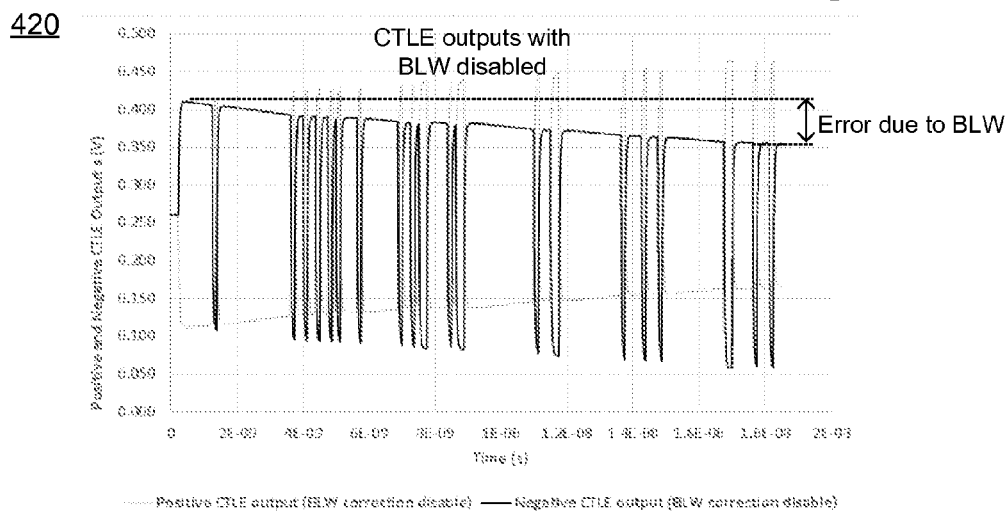
FIG. 4B illustrates a plot showing BLW error due to AC-coupling capacitors using traditional AC-coupled receiver front-end of FIG. 1B.
Figure 4C:
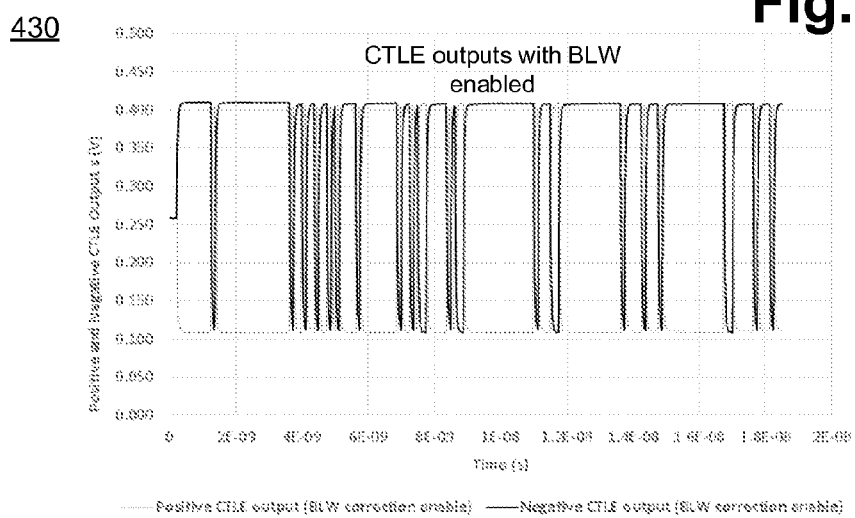
FIG. 4C illustrates a plot showing BLW error corrected using the apparatus of FIG. 2, according to some embodiments.

FIG. 4A illustrates plot 400 showing receiver differential inputs. Here, x-axis is time and y-axis is signal amplitude in volts. FIG. 4B illustrates plot 420 showing BLW error due to AC-coupling capacitors using traditional AC-coupled receiver front-end of FIG. 1B. Here, x-axis is time and y-axis is signal amplitude in volts. Plot 420 shows that for AC-coupled inputs with non-DC balanced data, the positive and the negative receiver outputs start drifting apart, which causes eye closure during transition bits. FIG. 4C illustrates plot 430 showing BLW error corrected using the apparatus of FIG. 2, according to some embodiments. Here, x-axis is time and y-axis is signal amplitude in volts. Plot 430 shows that for AC-coupled inputs with non-DC balanced data, the BLW correction scheme of various embodiments causes the output to remain stable around the DC level.

Figure 5:
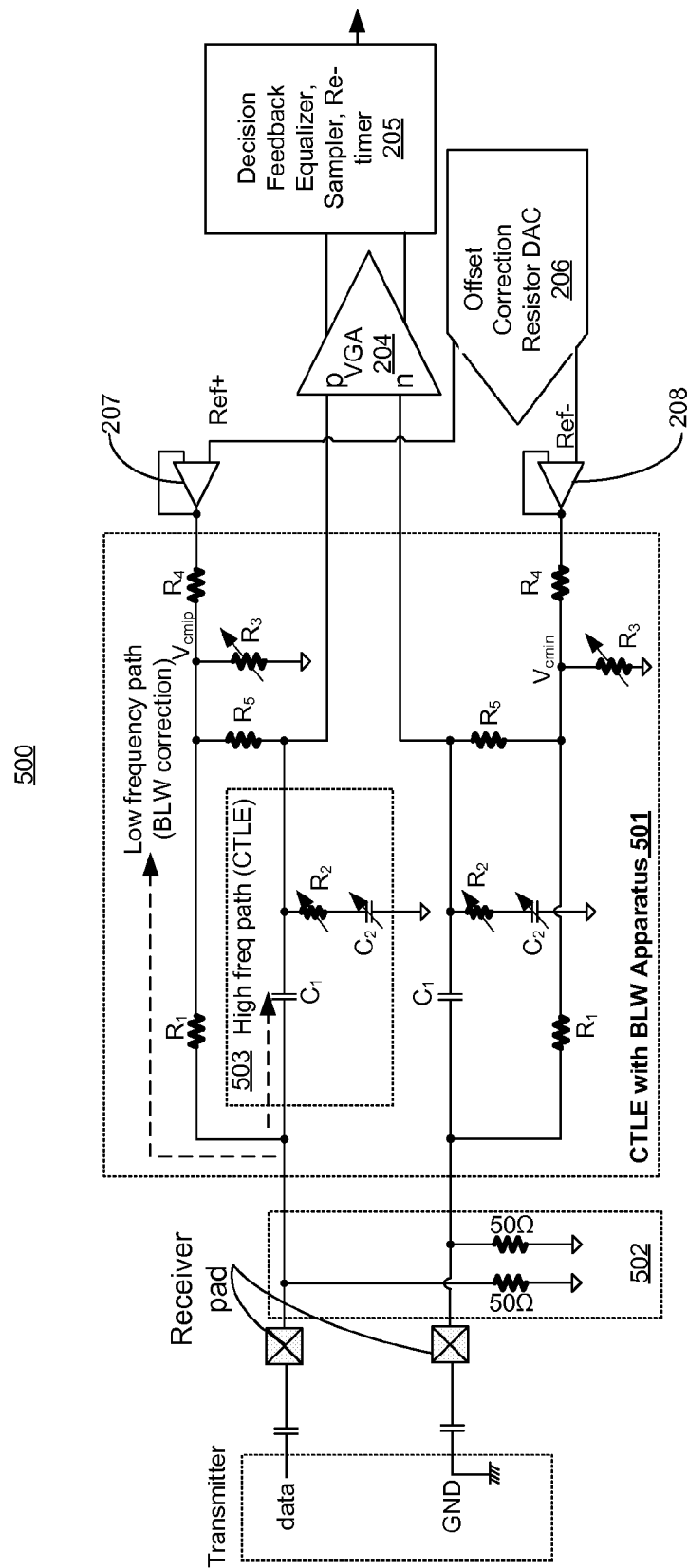
FIG. 5 illustrates a single-ended apparatus for linear equalization with continuous-time BLW correction, according to some embodiments of the disclosure.

FIG. 5 illustrates single-ended apparatus 500 for linear equalization with continuous-time BLW correction, according to some embodiments of the disclosure. It is pointed out that those elements of FIG. 5 having the same reference numbers (or names) as the elements of any other figure can operate or function in any manner similar to that described, but are not limited to such. So as not to obscure the embodiments of FIG. 5, differences between FIG. 5 and FIG. 2 are described. While the embodiments of FIG. 5 are described with reference to converting differential apparatus 200 into a single-ended apparatus 500, standalone single-ended apparatus for linear equalization with continuous-time BLW correction can be implemented using similar architecture.

Single-ended apparatus 500 is similar to apparatus 200 but using single-ended data instead of differential data dp/dn. In some embodiments, apparatus 500 comprises CTLE with BLW Apparatus 501, termination impedance block 502, and other blocks previously described with reference to FIG. 2. Here, the positive receiver pad is connected to the data port of the transmitter and the negative receiver pad is tied to ground of the transmitter through on-board ac-coupling capacitors.

Figure 6:
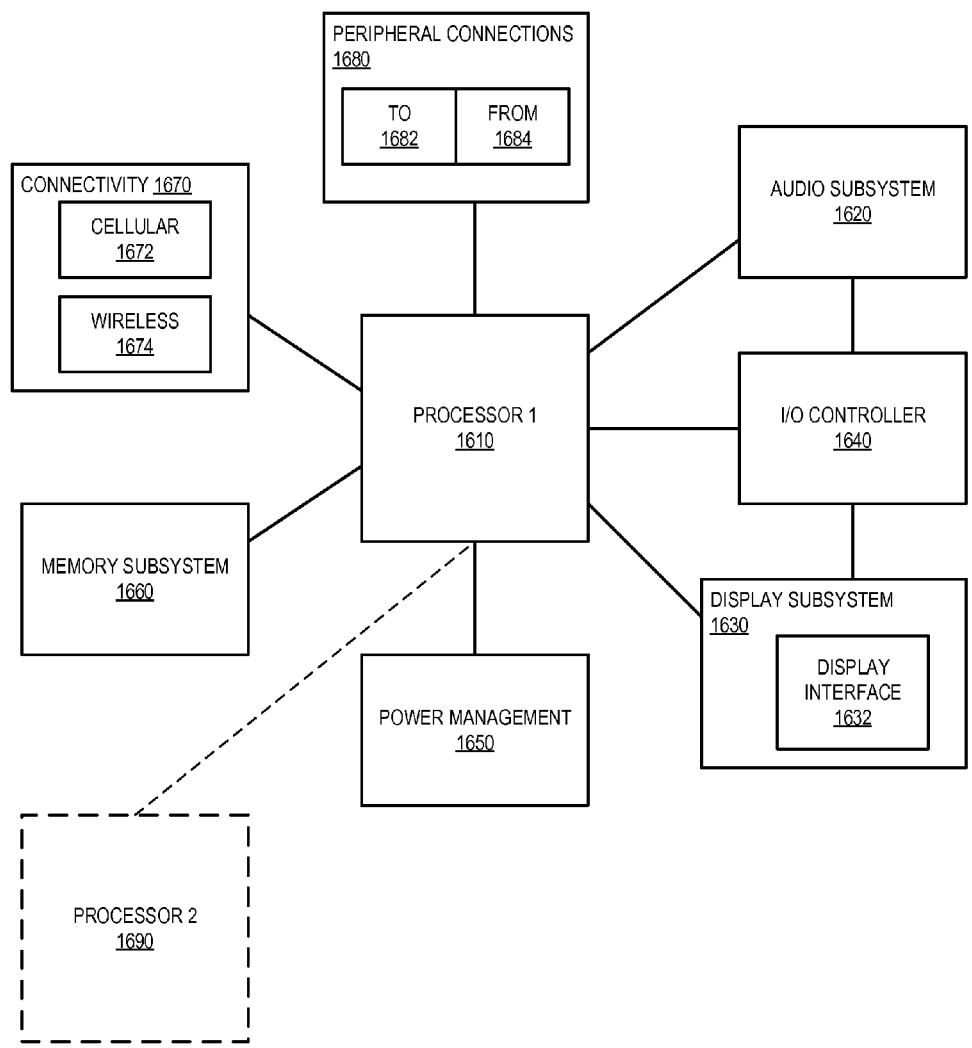
FIG. 6 illustrates a smart device or a computer system or a SoC (System-on-Chip) with apparatus for linear equalization with continuous-time BLW correction, according to some embodiments.

FIG. 6 illustrates a smart device or a computer system or a SoC (System-on-Chip) with apparatus for linear equalization with continuous-time BLW correction, according to some embodiments. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with apparatus for continuous-time linear equalizer and baseline wander correction, according to some embodiments discussed. Other blocks of the computing device 1600 may also include the apparatus for continuous-time linear equalizer and baseline wander correction of some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In some embodiments, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In some embodiments, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 includes connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: an amplifier; and an equalizer integrated with a BLW corrector, wherein the integrated equalizer and BLW corrector is coupled to the amplifier. In some embodiments, the equalizer is a passive continuous-time linear equalizer. In some embodiments, the BLW corrector is a continuous-time BLW corrector. In some embodiments, the apparatus comprises a reference voltage provider to provide a common mode reference voltage to the amplifier input via the BLW corrector. In some embodiments, the equalizer comprises a high frequency path coupled to an input of a receiver and to the amplifier.

In some embodiments, the high frequency path comprises: a first capacitive device coupled to the input of the receiver and to the amplifier; a second capacitive device; and a resistive device coupled to the amplifier and to the second capacitive device. In some embodiments, the resistive device has programmable resistance. In some embodiments, the second capacitive device has programmable capacitance. In some embodiments, the BLW corrector comprises a low frequency path coupled to the input of the receiver and to the amplifier.

In some embodiments, the high frequency path is a differential path. In some embodiments, the low frequency path is a differential path. In some embodiments, the low frequency path comprises one or more resistive devices coupled to the input of the receiver and to the amplifier. In some embodiments, the amplifier is a differential amplifier. In some embodiments, the apparatus comprises a decision feedback equalizer coupled to an output of the amplifier. In some embodiments, the apparatus comprises a ground referenced termination impedance coupled to equalizer and the BLW corrector.

In another example, a system is provided which comprises: a memory; a processor coupled to the memory, the processor having a receiver with an apparatus according to the apparatus described above; and a wireless interface for allowing the processor to communicate with another device. In some embodiments, the system comprises a display interface for allowing the processor to communicate with another device.

In another example, an apparatus is provided which comprises: a first pad; a second pad; and a differential equalizer integrated with a differential BLW corrector coupled to the first and second pads. In some embodiments, a reference voltage provider to provide a common mode reference voltage to the differential BLW corrector. In some embodiments, the apparatus comprises an amplifier coupled to the differential equalizer which is integrated with the differential BLW corrector. In some embodiments, the differential equalizer comprises a high frequency path, and wherein the differential BLW corrector comprises a low frequency path.

In another example, a system is provided which comprises: a memory; a processor coupled to the memory, the processor having a receiver with an apparatus according to the apparatus described above; and a wireless interface for allowing the processor to communicate with another device. In some embodiments, the system comprises a display interface for allowing the processor to communicate with another device.

In another example, an apparatus is provided which comprises: means for amplification; and means for equalizing and correcting baseline wander, wherein the means for equalizing and correcting baseline wander is coupled to the means for amplification. In some embodiments, the means for equalizing includes a passive continuous-time linear equalizer. In some embodiments, the means for correcting BLW is a continuous-time BLW corrector. In some embodiments, the apparatus comprises means for providing a common mode reference voltage to the amplifier input via the BLW corrector.

In some embodiments, the means for equalizing comprises a high frequency path coupled to an input of a receiver and to the means for amplification. In some embodiments, the high frequency path comprises: a first capacitive device coupled to the input of the receiver and to the means for amplification; a second capacitive device; and a resistive device coupled to the means for amplification and to the second capacitive device.

In some embodiments, the resistive device has programmable resistance. In some embodiments, the second capacitive device has programmable capacitance. In some embodiments, the means for correcting BLW comprises a low frequency path coupled to the input of the receiver and to the means for amplification. In some embodiments, the high frequency path is a differential path. In some embodiments, the low frequency path is a differential path. In some embodiments, the low frequency path comprises one or more resistive devices coupled to the input of the receiver and to the means for amplification. In some embodiments, the means for amplification comprises means for differential amplification.

In another example, a system is provided which comprises: a memory; a processor coupled to the memory, the processor having a receiver with an apparatus according to the apparatus described above; and a wireless interface for allowing the processor to communicate with another device. In some embodiments, the system comprises a display interface for allowing the processor to communicate with another device.

In another example, a method is provided which comprises equalizing an input signal and substantially concurrently correcting baseline wander associated with the input signal. In some embodiments, equalizing is performed by a passive continuous-time linear equalizer. In some embodiments, the correcting BLW is performed by a continuous-time BLW corrector. In some embodiments, the method comprises providing a common mode reference voltage to an amplifier input via the BLW corrector.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a differential amplifier; and
an equalizer integrated within a baseline wander (BLW) corrector such that the equalizer and the BLW corrector comprise common circuits, wherein the equalizer integrated within the BLW corrector is coupled to the differential amplifier, wherein the differential amplifier is to receive inputs from the equalizer integrated within the BLW corrector, and wherein the BLW corrector is a continuous-time BLW corrector.

2. The apparatus of claim 1, wherein the equalizer is a passive continuous-time linear equalizer.

3. The apparatus of claim 1 comprises a reference voltage provider to provide a common mode reference voltage to the differential amplifier input via the BLW corrector.

4. The apparatus of claim 1, wherein the equalizer comprises a high frequency path coupled to an input of a receiver and to the differential amplifier.

5. The apparatus of claim 4, wherein the high frequency path comprises:
a first capacitive device coupled to the input of the receiver and to the differential amplifier;
a second capacitive device; and
a resistive device coupled to the amplifier and to the second capacitive device.

6. The apparatus of claim 5, wherein the resistive device has programmable resistance.

7. The apparatus of claim 5, wherein the second capacitive device has programmable capacitance.

8. The apparatus of claim 4, wherein the BLW corrector comprises a low frequency path coupled to the input of the receiver and to the differential amplifier.

9. The apparatus of claim 4, wherein the high frequency path is a differential path.

10. The apparatus of claim 8, wherein the low frequency path is a differential path.

11. The apparatus of claim 8, wherein the low frequency path comprises one or more resistive devices coupled to the input of the receiver and to the differential amplifier.

12. The apparatus of claim 1 further comprises a decision feedback equalizer coupled to an output of the differential amplifier.

13. The apparatus of claim 1 further comprises a ground referenced termination impedance coupled to the equalizer integrated within the BLW corrector.

14. The apparatus of claim 1, wherein the equalizer applies adjustable capacitance ratio to realize linear equalization with AC-to-DC peaking.

15. The apparatus of claim 14, wherein the equalizer integrated within the BLW corrector is configured to decouple a stable peaking frequency from the AC-to-DC peaking.

16. The apparatus of claim 1, wherein the equalizer integrated within the BLW corrector is at least part of one of:
PCI compliant receiver;
SATA compliant receiver; or
USB compliant receiver.

17. The apparatus of claim 1, wherein the equalizer integrated within the BLW corrector comprises passive devices or transistors configured as resistors and capacitors.

18. An apparatus comprising:
a first pad;
a second pad;
a differential equalizer integrated within a differential baseline wander (BLW) corrector such that the differential equalizer integrated within the differential BLW corrector comprises common circuits, wherein the differential equalizer integrated within the differential BLW corrector is coupled to the first and second pads; and a differential amplifier coupled to the differential equalizer integrated within the differential BLW corrector, wherein the differential amplifier is to receive inputs from the differential equalizer integrated within the differential BLW corrector, and wherein the differential BLW corrector is a continuous-time differential BLW corrector.

19. The apparatus of claim 18 comprises a reference voltage provider to provide a common mode reference voltage to the differential BLW corrector.

20. The apparatus of claim 18, wherein the differential equalizer comprises a high frequency path, and wherein the differential BLW corrector comprises a low frequency path.

21. A system comprising:

a memory;

a processor coupled to the memory, the processor having a receiver including:

a differential amplifier; and an equalizer integrated within a baseline wander (BLW) corrector such that the equalizer integrated within the BLW corrector comprises common circuits, wherein the equalizer integrated within the BLW corrector is coupled to the differential amplifier, wherein the differential amplifier is to receive inputs from the equalizer integrated within the BLW corrector, and wherein the BLW corrector is a continuous-time BLW corrector; and a wireless interface for allowing the processor to communicate with another device.

22. The system of claim 21, wherein the processor comprises a reference voltage provider to provide a common mode reference voltage to the BLW corrector.

23. The system of claim 21, wherein the equalizer comprises a high frequency path coupled to an input of a receiver and to the differential amplifier.

* * * * *